United States Patent
Sayari et al.

(10) Patent No.: US 9,314,730 B1
(45) Date of Patent: Apr. 19, 2016

(54) STABILIZED AMINE-CONTAINING $CO_2$ ADSORBENTS AND RELATED SYSTEMS AND METHODS

(75) Inventors: Abdelhamid Sayari, Ottawa (CA); Youssef Belmabkhout, Gatineau (CA)

(73) Assignee: Abdelhamid Sayari, Ottawa (CA)

( * ) Notice: Subject to any disclaimer, the term of this patent is extended or adjusted under 35 U.S.C. 154(b) by 244 days.

(21) Appl. No.: 12/976,557

(22) Filed: Dec. 22, 2010

Related U.S. Application Data

(60) Provisional application No. 61/289,198, filed on Dec. 22, 2009.

(51) Int. Cl.
  *B01D 53/02* (2006.01)
  *B01J 20/28* (2006.01)

(52) U.S. Cl.
  CPC ............ *B01D 53/02* (2013.01); *B01J 20/28057* (2013.01)

(58) Field of Classification Search
  CPC ...................................................... B01D 53/02
  USPC ...................................................... 502/34–56
  See application file for complete search history.

(56) References Cited

U.S. PATENT DOCUMENTS

| | | | | |
|---|---|---|---|---|
| 5,876,488 A | * | 3/1999 | Birbara | .............. B01D 53/1475 422/178 |
| 6,364,938 B1 | | 4/2002 | Birbara et al. | |
| 7,056,482 B2 | * | 6/2006 | Hakka et al. | .................. 423/230 |
| 7,288,136 B1 | | 10/2007 | Gray et al. | |
| 7,767,004 B2 | | 8/2010 | Sayari et al. | |
| 7,795,175 B2 | | 9/2010 | Olah et al. | |
| 8,298,986 B2 | | 10/2012 | Jones et al. | |
| 2006/0165574 A1 | * | 7/2006 | Sayari | .................... B01D 53/02 423/210 |
| 2008/0276804 A1 | * | 11/2008 | Sayari et al. | .................... 95/285 |

FOREIGN PATENT DOCUMENTS

WO    WO 2008/021700 A1    2/2008

OTHER PUBLICATIONS

Harlick et al. "Applications of pore-expanded mesoporous silicas. 3. triamine silane grafting for enhanced CO2 adsorption". Ind. Eng. Chem. Res. 2005, 45, 3248-3255.*
Ahnfeldt, T., Gunzelmann, D., Loiseau, T., Hirsemann, D., Senker, J., Ferey, G., Stock, N.; "Synthesis and Modification of a Functionalized 3D Open-Framework Structure With Mil-53 Topology"; Inorg Chem. 2009, 48, 3057-3064.
Arstad, B., Fjellvåg, H., Kongshaug, K.O., Swang, O., Blom, R.; "Amine Functionalized Metal Organic Frameworks (MOFs) as Adsorbents for Carbon Dioxide"; Adsorption 2008; 14, 755-762.
Belmabkhout, Y., Sayari, A.; "Effect of Pore Expansion and Amine Functionalization of Mesoporous Silica on CO2 Adsorption Over a Wide Range of Conditions"; Adsorption 2009, 15, 318-328.
Belmabkhout, Y., Serna-Guerrero, R., Sayari, A.; "Adsorption of CO2-Containing Gas Mixtures Over Amine-Bearing Pore-Expanded MCM-41 Silica: Application for Gas Purification"; Ind. Eng. Chem. Res. 2010, 49,359-365.

(Continued)

*Primary Examiner* — Jennifer A Smith

(57) ABSTRACT

The present invention provides (i) a method and system for stabilizing the performance of amine-containing $CO_2$ adsorbents using wet feed gas and/or wet purge gas and (ii) a method for regeneration of deactivated amine-containing $CO_2$ adsorbents via hydrolysis of the urea groups formed during deactivation.

5 Claims, 8 Drawing Sheets

(56) References Cited

OTHER PUBLICATIONS

Chen, C., Yang, S.T., Ahn, W-S., Ryoo, R.; "Amine-Impregnated Silica Monolith With Hierarchical Pore Structure: Enhancement of CO2 Capture Capacity"; ChemComm, 2009, 3627-3629.

Choi, S., Drese, J.H., Jones, C.W.; "Adsorbent Materials for Carbon Dioxide Capture From Large Anthropogenic Point Sources"; ChemSusChem. 2009, 2, 796-854.

Couck, S., Denayer, J.F.M., Baron, G., Remy, T., Gascon, J., Kapteijn, F.; "An Amine-Functionalized Mil-53 Metal—Organic Framework With Large Separation Power for CO2 and CH4"; J. Am. Chem. Soc. 2009, 131, 6326-6327.

Drage, T.C., Arenillas, A., Smith, K.M., Snape, C.E.; "Thermal Stability of Polyethylenimine Based Carbon Dioxide Adsorbents and Its Influence on Selection of Regeneration Strategies"; Microporous Mesoporous Mater. 2008, 116, 504-512.

Franchi, R., Harlick, P.J.E., Sayari, A.; "Application of Pore-Expanded Mesoporous Silica 2. Development of a High-Capacity, Water-Tolerant Adsorbent for CO2"; Ind. Eng. Chem. Res. 2005, 44, 8007-8013.

Gray, M.L., Hoffman, J.S., Hreha, D.C., Fauth, S.W., Hedges, S.W., Champagne, K.J., Pennline, H.; "Parametric Study of Amine Sorbents for the Capture of Carbon Dioxide"; Energy Fuel, 2009, 23, 4840.

Harlick, P.J.E., Sayari, A.; "Application of Pore-Expanded Mesoporous Silica 5. Triamine Grafted Material With Exceptional CO2 Dynamic and Equilibrium Adsorption Performance"; Ind. Eng. Chem. Res. 2007, 46, 446.

Hicks, J.C., Drese, J.D., Fauth, D.J., Gray M,L., Qi, G., Jones, C.W.; "Designing Adsorbents for CO2 Capture From Flue Gas—Hyperbranched Aminosilicas Capable of Capturing CO2 Reversibly"; J. Am. Chem. Soc. 2008, 130, 2902.

Elahe Ghasemian Langeroudi, Freddy Kleitz, Maria C. Illuta and Faïçal Larachi; "Grafted Amine/CO2 Interactions in (Gas-)Liquid-Solid Adsorption/Absorption Equilibria"; J. Phys. Chem. C, 2009, 113 (52), pp. 21866-21876.

Ma, X., Wang, X., Song, C.; ""Molecular Basket" Sorbent for Separation of CO2 and H2S From Various Gas Streams"; J. Am. Chem. Soc. 2009, 131, 5777-5783.

Plaza, M.G., Pevida, C., Arias, B., Casal, M.D., Martin, C.F, Fermoso, J., Rubiera, F., Pis, J.J.; "Different Approaches for the Development of Low-Cost CO2 Adsorbent"; J. Environ. Eng. 2009, 135, 426.

Sayari, A., Kruk, M., Jaroniec, M., Moudrakovski, I.L.; "New Approaches to Pore Size Engineering of Mesoporous Silicates"; Adv. Mater., 1998, 10, 1376-1379.

Serna-Guerrero, R. Da'na, E. Sayari, A.; "New Insights Into the Interactions of CO2 Over Amine-Functionalized Silica"; Ind. Eng. Chem. Res. 2008, 47, 9406-9412.

Yue, M.B., Sun, L.B., Cao, Y., Wang, Y., Wang, Z.J., Zhu, J.H.; "Efficient CO2 Capturer Derived From As-Synthesized MCM-41 Modified With Amine"; Chem. Eur. J. 2008, 14, 3442.

Zheng, F., Tran, D.N., Busche, B.J., Fryxell, G.E., Addleman, R.S., Zemanian, T.S., Aardahl, C.L.; "Ethylenediamine-Modified SBA-15 as Regenerable CO2 Adsorbents"; Ind. Eng. Chem. Res. 2005, 44, 3099-3405.

Vaidhyanathan, R., Iremonger, S.S., Dawson, K-W., Shimizu, G.K. H.; "An Amine-Funtionalized Metal Organic Framework for Preferential CO2 Adsorption at Low Pressures"; Chem. Commun, 2009, 5230-5232.

Abdelhamid Sayari and Youssef Belmabkhout; "Stabilization of Amine-Containing CO2 Adsorbents: Dramatic Effect of Water Vapor"; J. Am. Chem. Soc. 2010, 132, 6312-6314.

\* cited by examiner

STABILIZED AMINE-CONTAINING CO$_2$ ADSORBENTS AND RELATED SYSTEMS AND METHODS

CROSS-REFERENCE TO RELATED APPLICATION

This application claims priority to and the benefit of U.S. Provisional Patent Application No. 61/289,198, filed Dec. 22, 2009, entitled "Stabilized Amine-Containing CO$_2$ Adsorbents and Related systems and Methods," which is incorporated herein by reference in its entirety.

FIELD OF THE INVENTION

The present invention pertains to the field of adsorption methods and systems for carbon dioxide capture, more particularly, to the field of (i) adsorption methods and systems, (ii) stabilization methodologies of amine-containing adsorbents for CO$_2$ separation and the purification of carbon dioxide-containing gases, and (iii) regeneration of deactivated amine-containing CO$_2$ adsorbents

BACKGROUND

Capture of anthropogenic carbon dioxide from large sources of emission such as fossil fuel power plants is a key target in the ongoing effort to mitigate the effect of greenhouse gases on global climate change. Although mature, the liquid phase amine scrubbing technology suffers from inherently high regeneration cost, equipment corrosion and amine oxidative degradation. As a result, there is a strong tendency to develop recyclable solid sorbents to achieve competitive, less energy intensive acid gas removal alternatives.

Most physical CO$_2$ adsorbents such as 13X zeolite, activated carbons, periodic mesoporous silica and metal-organic frameworks (MOFs) require a large pressure and/or temperature gradient between the adsorption and desorption stages to enable both efficient adsorption performances and near complete desorption of CO$_2$. Moreover, they exhibit relatively low selectivity toward CO$_2$, generally low tolerance to water vapour in the gas feed, and their CO$_2$ separation performance decreases drastically by increasing the temperature.

Incorporation of amine groups onto large surface area porous solids via direct synthesis, impregnation, surface polymerization, surface grafting or co-condensation as a promising approach for CO$_2$ capture has gained prominence in recent years. When properly designed, such materials exhibit high adsorption capacity, fast CO$_2$ adsorption and desorption and low energy recycling requirement.

In addition to the above-mentioned attributes, amine-containing materials are tolerant to the occurrence of moisture in the feed. Actually, CO$_2$ adsorption is enhanced by the presence of moisture in the feed (Serna-Guerrero et al. 2008). The reason lies within the nature of the amine—CO$_2$ interactions. Under dry adsorption conditions, surface amine groups interact with CO$_2$ to form carbamate with a stoichiometric CO$_2$/N ratio of 0.5, whereas under proper humidity conditions, bicarbonate with a stoichiometric ratio CO$_2$/N=1 may be formed (Serna-Guerrero et al. 2008). In contrast, in the presence of other adsorbents such as zeolites and activated carbons, CO$_2$ adsorption is inhibited by moisture because of unfavourable competition.

However, despite the large number of contributions devoted to CO$_2$ adsorption over amine-containing materials (Choi et al. 2009), and despite the utmost importance of the long term stability of such materials, no studies addressed the issue of adsorbent stability through extensive recycling.

The lifetime of adsorbents, which determines the frequency of their replacement, is a critical parameter of equal importance as CO$_2$ adsorption capacity, selectivity and kinetics, having a direct impact on the economics of any commercial scale operation.

This background information is provided for the purpose of making known information believed by the applicant to be of possible relevance to the present invention. No admission is necessarily intended, nor should be construed, that any of the preceding information constitutes prior art against the present invention.

SUMMARY

An object of the present invention is to provide a method and a system for stabilizing amine-containing adsorbents, for example, for use in steady state operation of amine-containing adsorbents for the purpose of CO$_2$ capture and removal.

In accordance with one aspect, there is provided a method of stabilizing an amine-containing CO$_2$ adsorbent comprising contacting said amine-containing CO$_2$ adsorbent with one or more humid gas streams. This method can be employed in a process for selectively removing or recovering CO$_2$ from a gaseous stream or atmosphere containing CO$_2$.

It has now been found that the stability of amine-containing CO$_2$ adsorbents used in a system for removal of CO$_2$ is enhanced when adsorption and desorption stages are carried out in the presence of moisture-containing feed and purge gases. Furthermore, the CO$_2$ adsorption capacity of triamine-grafted mesoporous silica demonstrates a gradual decrease upon adsorption-desorption cycling under mild conditions. In contrast, the stability of triamine-grafted mesoporous silica drastically improves in the presence of moisture-containing gases. The loss in stability of amine-containing adsorbent material has been found to be linked to the formation and accumulation of urea groups even under mild, but dry conditions, while the formation of urea group is inhibited in the presence of moisture.

In accordance with another aspect, there is provided a method for regeneration of a deactivated amine-containing CO$_2$ adsorbent comprising hydrolyzing urea groups in said deactivated adsorbent at high temperature in the presence of moisture.

In accordance with another aspect, there is provided a system for removal of CO$_2$ from a gaseous stream comprising: (a) one or more sorbent beds comprising an amine-containing adsorbent; (b) means for controlling a CO$_2$-containing feed gas flow through said one or more sorbent beds; (c) means for controlling a purge gas flow through said one or more sorbent beds; (d) means for controlling the relative humidity of said feed gas, said purge gas or both said feed gas and said purge gas. The system for CO$_2$ removal can include means of removing the CO$_2$ from the sorbent bed by pressure-swing (PS), vacuum-swing (VS), temperature-swing (TS) regeneration modes or a combination thereof in fixed, moving or fluidized beds; a means of adjusting the relative humidity of the gaseous stream used for adsorption and/or desorption, and a means of adjusting the level of hydration of the sorbent bed during adsorption and/or desorption.

In accordance with another aspect, there is provided a system for removing or recovering CO$_2$ from an gaseous stream or atmosphere containing said CO$_2$ using amine-containing CO$_2$ adsorbents with enhanced stability in terms of CO$_2$ capture performance over hundreds of adsorption-desorption cycles in the presence of moisture-containing feed gas and/or moisture-containing purge gas in the range of about 0.1% to 100% relative humidity (RH).

In accordance with another aspect of the invention, there is provided a system for removing or recovering $CO_2$ from a gaseous stream or atmosphere containing said $CO_2$ using different selective amine-containing $CO_2$ adsorbent where the purge gas may be moisture-containing non-adsorbing gas, moisture-containing $CO_2$ or steam.

DETAILED DESCRIPTION OF THE INVENTION

Figure 1:
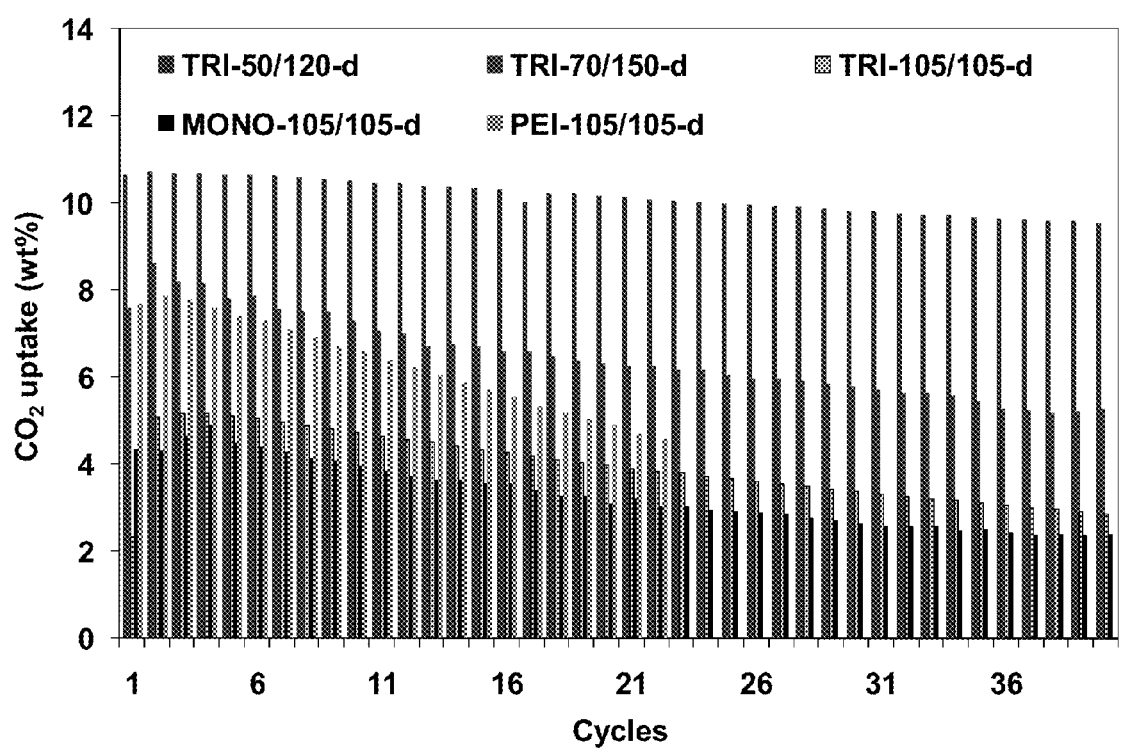
FIG. 1 graphically depicts dynamic $CO_2$ adsorption over a number of $CO_2$ adsorption-desorption cycles on mono amine and triamine grafted pore-expanded MCM-41 (MONO and TRI, respectively) and polyethyleneimine-impregnated pore-expanded MCM-41 (PEI) carried out under various conditions using dry feed and purge gases.

Unless defined otherwise, all technical and scientific terms used herein have the same meaning as commonly understood by one of ordinary skill in the art to which this invention belongs.

As used in the specification and claims, the singular forms "a", and "the" include plural references unless the context clearly dictates otherwise.

The term "comprising" as used herein will be understood to mean that the list following is non-exhaustive and may or may not include any other additional suitable items, for example one or more further feature(s), component(s) and/or ingredient(s) as appropriate.

It has now been shown that during $CO_2$ adsorption-desorption cycling under dry conditions, amine-containing adsorbent materials ultimately deactivate, even under mild conditions, through formation of urea groups on and/or in the adsorbent materials. In order to minimize deactivation, the present invention provides a method to enhance the stability of such amine-containing materials. The present invention further provides a method for regeneration of the deactivated adsorbent materials.

The present application provides a method of stabilizing amine-containing materials used as $CO_2$ adsorbents. The amine-containing adsorbents retain a stable adsorption capacity when used under humid conditions. Accordingly, the present invention provides a method of stabilizing an amine-containing $CO_2$ adsorbent that includes the step of contacting the adsorbent with a gas containing $CO_2$ and possibly other acid gases, having a relative humidity of at least about 0.1%, and/or the step of regenerating the adsorbent in the presence of a purge gas with a relative humidity from about 0.1% to about 100%.

Amine-Containing Adsorbent

The amine-containing adsorbents useful in the method and system described herein are large surface area porous solids that include amines that are accessible to the adsorbate during an adsorption process to remove $CO_2$ from a gas.

Generally, there are three major classes of amine-containing adsorbents suitable for $CO_2$ removal, namely (i) materials with surface-anchored amine species prepared by aminosilane grafting or cocondensation or in-situ surface polymerization of reactive amines such as aziridine (Hicks et al., 2008), (ii) amine-containing species such as ethanolamine (Franchi et al., 2005) or polyethyleneimine (Yue et al. 2008, Ma et al. 2009), impregnated onto materials with high surface area such as carbon or mesoporous silica, and (iii) amine-containing MOFs (Couck et al. 2009; Vaidhyanathan et al. 2009; Arstad et al. 2008). A suitable adsorbent can be prepared using various methods, including those already known, in order to obtain $CO_2$ adsorbents having varying capacities and rates of adsorption depending on the potential use of the material.

Non-limiting examples of suitable amine-containing adsorbents are monoamine and triamine-grafted pore-expanded MCM-41 mesoporous silica, polyethyleneimine-impregnated PE-MCM-41, and amine-functionalized MOFs.

The amines used in the preparation of the adsorbent must exhibit sufficient basicity to allow for efficient reaction with $CO_2$, and/or other acidic gases to be adsorbed. In addition a high N/C ratio can be beneficial to maximising the concentration of amine groups within the adsorbent. In order to allow effective regeneration of the adsorbent, the adsorbent should be thermally stable during the desorption process.

The amines may be primary amines, secondary amines, tertiary amines, mixed amines or any combination thereof. As shown in the following section, amines can be introduced via different routes including (i) grafting or co-condensation using amine-containing trialkoxy- or trichlorosilanes, (ii) adsorption, (iv) impregnation, (iv) surface polymerization of amine-containing monomers, (v) synthesis or post-synthesis pore expansion using amines, (vi) reaction with framework or with pending reactive groups, and (vii) self assembly with silica or organosilica precursors using amphiphile amines. The means by which amines are introduced to solid supports will change depending on the type of support material used, the desired adsorbent configuration, the nature of the amine, etc.

Selection of the specific amine or amines to be used in the preparation of the adsorbent of the present invention will depend on the configuration of the adsorbent and on the application for which the adsorbent is intended. For example, in cases where a high adsorptive capacity is not critical, the amine or amines will be selected keeping in mind characteristics such as high regeneration ability, low cost and ready availability rather than maximum reactivity. In general, primary and secondary amines are more reactive with acidic gases than tertiary amines. Similarly, primary amines are generally more reactive than secondary amines. Further, the configuration of the adsorbent may impose limitations on the nature of the amine that can be used.

$CO_2$ Adsorption Method and System

The present application further provides a method and a system for removing $CO_2$ exclusively or combined with other acid gases, such as $H_2S$, from a gaseous stream containing $CO_2$ and possibly one or more other acid gases. For simplicity, the following discussion specifically refers to $CO_2$ only, as the acid gas, however, it should be understood that other acid gases will also be removed, if they are available in the gaseous stream. Further provided is a system and process for $CO_2$ adsorption that include a means for, or the step of, contacting an amine-containing adsorbent alternatively with feed and purge gases at atmospheric or sub-atmospheric pressure, that have a relative humidity of at least about 0.1%, or as high as about 100%.

According to the presently described method and system, an amine-containing adsorbent is employed in a sorbent bed for use in a cyclic adsorption-desorption process carried out under humid conditions. In accordance with one embodiment, the $CO_2$ adsorption and desorption are carried out using feed and/or purge gases having a relative humidity of at least about 0.1%. In accordance with another embodiment, the feed and/or purge gases have a relative humidity of from about 0.1% to about 100%. In accordance with another embodiment, the purge gas may be a wet inert gas, a wet non-adsorbing gas, wet $CO_2$ or steam. In accordance with another embodiment, the total pressure of the purge gas is varying between 0.05 bar and 1 bar.

To apply an amine-containing adsorbent to such a cyclic adsorption-desorption process, the adsorbent must be formed into a stable, mechanically strong form. These forms may include, but are not limited to, powder forms, pellet forms, monolithic structures or foams. In the case of pellet forms, the adsorbent is mixed with a suitable inert or active secondary material as a binder. Criteria for selecting a suitable binder can include (i) achieving pellets or extrudates with minimum amount of binder; (ii) enhanced mechanical stability; (iii) preservation of adsorbent porosity and accessibility of adsorption sites; and (iv) affordability. For example, siloxanes and siloxane derivatives can be employed to form structured pellets, either extrudates or spheres, using the appropriate weight percentage of additive. The selection of the appropriate form and, if necessary, additive, is based on the application of the adsorbent and the type of equipment used in the $CO_2$ removal process. The selection and manufacture of the adsorbent form is well within the ordinary abilities of a worker skilled in the art.

Once the adsorbent form is selected and manufactured, it is used in a sorbent bed where a gaseous stream containing $CO_2$, and having a relative humidity of at least about 0.1%, contacts the adsorbent. The $CO_2$ and amine or $CO_2$, amine and water chemically react to form a complex, thereby removing the $CO_2$ from the gaseous stream.

According to a specific embodiment, once the adsorbent is loaded with $CO_2$ to a satisfactory level, for example, when greater than 80% of the amine has been converted to the amine complex, or at a designated cycle time, the sorbent bed can be regenerated. Regeneration comprises ceasing the flow of the gaseous stream through the bed and desorbing the adsorbed $CO_2$ at atmospheric or sub-atmospheric pressure. The endothermic desorption reaction is accomplished by thermal and/or pressure gradient means and by the use of a purge gas, or any combination thereof. During this step, the amine complex is dissociated, $CO_2$ is removed and the amine is freed and ready for re-use.

Various means can be incorporated in the system of the present invention to produce a relative humidity of at least about 0.1% in the feed and purge gases. In accordance with one embodiment, the system includes a water humidifier through which the feed and the purge gases used for adsorption and desorption are contacted with water at an appropriate temperature to achieve the desired relative humidity at the desired adsorption or desorption temperature. Other means by which the humidity of gases can be adjusted include, but are not limited to, heat and moisture exchangers and ultrasonic nebulizers.

It is understood that a suitable adsorbent is not necessarily limited to use for the exclusive removal of $CO_2$ from a gaseous stream. Rather the adsorbent can be used for the removal of additional acid gases, if they occur in the $CO_2$-containing gaseous feed.

In one embodiment, use of the adsorbent to remove $CO_2$, with or without other acid gases, can comprise utilising two or more sorbent beds operating cyclically such that the first bed is in the adsorption cycle while the second bed is in the desorption cycle. Such a system comprises two or more sorbent beds and computer or manually controlled valves and pumps allowing for continuous removal of $CO_2$ (and possibly other acid gases) from the gaseous stream. In the adsorption cycle, an exothermic reaction occurs between $CO_2$ in the gaseous stream, which is flowing through the adsorbent, and the amine present in the adsorbent, thereby adsorbing the $CO_2$ and forming a $CO_2$-amine complex. This complex can also be a combination of amine, $CO_2$ and water. In one embodiment of the present invention, the heat produced during the adsorption process in the first bed can be transferred via a heat exchanger to the second bed to drive the endothermic desorption of the adsorbed $CO_2$ and water simultaneously occurring therein. Alternatively, the desorption process can be effected through thermal and/or pressure gradient means independent of the adsorption process. Highly stable adsorbent is obtained when the gas feed used for adsorption and/or the purge gas used for desorption contain water vapour at a relative humidity of at least ca. 0.1% up to ca. 100%.

Among the different possibilities, moisture-containing $CO_2$ or steam can be used as purge gas to desorb $CO_2$. In both cases, pure $CO_2$ may be separated, and if need be, pressurized and stored.

To gain a better understanding of the invention described herein, the following examples are set forth. It should be understood that these examples are for illustrative purposes only. Therefore, they should not limit the scope of this invention in any way.

EXAMPLES

Example 1

Adsorption-Desorption Cycling of Amine-Containing $CO_2$ Adsorbents in the Presence and Absence of Moisture The loss of stability of amine-containing adsorbents through extensive $CO_2$ adsorption-desorption cycling under dry conditions, and the stabilization of amine-containing adsorbents through operation under humid conditions were investigated using triamine (TRI-PE-MCM-41) and, monamine (MONO-PE-MCM-41)-grafted pore-expanded MCM-41 mesoporous silica and polyethyleneimine-impregnated PE-MCM-41 (PEI-PE-MCM-41).

Materials

1. Preparation of Amine-modified Materials

TRI-PE-MCM-41 and MONO-PE-MCM-41 were prepared following the procedures described elsewhere (Sayari and Harlick 2010 and Serna-Guerrero et al. 2008, respectively. Briefly, MCM-41 type silica was produced at 100° C. in the presence of cetyltrimethylammonium bromide in basic conditions using tetramethylammonium hydroxide. Subsequently, the pore size of MCM-41 was increased by hydrothermal restructuring at 120° C. in the presence of an aqueous suspension of dimethyldecylamine [Sayari et al., 1998]. The surfactant template and pore expander agent were removed by calcination in nitrogen, then in air at 550° C., providing PE-MCM-41. The amine functional groups were incorporated onto PE-MCM-41 by grafting in toluene at 85° C. in a 250 mL glass reactor. First, 0.3 ml of water per g of silica was added to a PE-MCM-41 silica suspension in toluene, followed by addition of monoamine or triamine-containing silane (3 ml per g of silica). Grafting proceeded for 16 h, and then the product was filtered and washed with toluene and pentane.

Polyethyleneimine-containing material was prepared by dispersing PEI (molecular weight=324) on PE-MCM-41 as follows. An amount of 1 g of PEI was dispersed in methanol at room temperature followed by the addition of 1 g PE-MCM-41 to the mixture under continuous stirring. The mixture was stirred for 30 min and the slurry was dried overnight under ambient air.

Two amine-containing MOFs, namely amino-MIL-53 and Zn-aminotriazolato-oxalate were also prepared according to the methods set out in Ahnfeldt et al. 2009 and Vaidhyanathan et al. 2009, respectively.

Table 1 provides the structural properties and amine content of the materials, referred to as MONO, TRI and PEI.

TABLE 1

Characteristics of amine-containing $CO_2$ adsorbents

| Amine-containing material | Surface area $S_{BET}$ (m$^2$/g) | Pore volume $V_p$ (cm$^3$/g) | Pore size $D_p$ (nm) | Amine loading | Amine type[a] |
|---|---|---|---|---|---|
| MONO | 420 | 0.65 | 7.2 | 4.3 mmol/g | I |
| TRI | 367 | 0.87 | 9.4 | 7.9 mmol/g | I, II |
| PEI | 4.5 | * | * | 50 wt % | I, II, III |

(a) I: Primary; II: Secondary; III Tertiary.

2. Preparation of Mesoporous Silica Containing Urea Groups

The urea-containing species was incorporated onto PE-MCM-41 by grafting (bis(trimethoxysilylpropyl)urea in toluene at 85° C. using a 250 ml glass reactor. First, 0.3 ml of water per gram of silica was added to a PE-MCM-41 silica suspension in toluene, followed by addition of the silane (1.5 ml per gram of silica). Grafting proceeded for 16 h, and then the product was filtered and washed with toluene and pentane. The obtained material was labelled as UREA. The characteristics of the UREA sample were as follows: Urea loading: 4.3 mmol/g; surface area: 546 m$^2$/g; pore volume: 0.8 cm$^3$/g and pore diameter: 6.1 nm.

Cyclic $CO_2$ Adsorption-Desorption Studies

The cyclic $CO_2$ adsorption-desorption experiments were carried out using a Rubotherm magnetic microbalance (Belmabkhout and Sayari, 2009). The procedure was as follows: the sample was first activated in the presence of flowing UHP nitrogen at 50 mL/min for 30 min at a specified temperature (see below) under atmospheric pressure. Subsequently, the sample was cooled down to the adsorption temperature under isobaric condition and the feed gas was switched to pure $CO_2$ at 50 mL/min. The effective adsorption capacity (non-equilibrium) was assumed to be the weight gain of the sample after 30 min exposure. This procedure was repeated over tens or hundreds cycles (i.e., regeneration and $CO_2$ adsorption).

All the $CO_2$ adsorption-desorption cycling experiments reported herein were carried out at atmospheric pressure. The gas feed (pure $CO_2$) and the purge gas (pure $N_2$) used for desorption were either dry or contained a level of moisture corresponding to the equilibrium vapour pressure of water at 20° C. The actual relative humidity (RH) depended on the temperature of the gas stream, varying from 100% at 20° C. to 0.4% at 150° C. Under such conditions, the triamine-grafted material undergoing adsorption at X ° C. and desorption at Y ° C. under dry conditions will be referred to as TRI-X/Y-d. When the cycling experiment is carried out using moisture-containing gas streams, the material will be designated as TRI-X/Y-h. The same nomenclature applies to the other adsorbents.

FIG. 1 shows the dynamic $CO_2$ adsorption uptake over a number of adsorption-desorption cycles carried out at different conditions, in the presence of different adsorbents. As seen, in all cases, the materials deactivate at a rate that is dependent on the severity of the cycling conditions and on the nature of the adsorbent. The percentage loss of capacity was 14% for TRI-50/120-d over 40 cycles and as high as 41% for PEI-105/105-d for only 22 cycles. Under the same cycling conditions, adsorbents with grafted amines, MONO-105/105-d and TRI-105/105-d, deactivated by 45% over 40 cycles.

Figure 2:
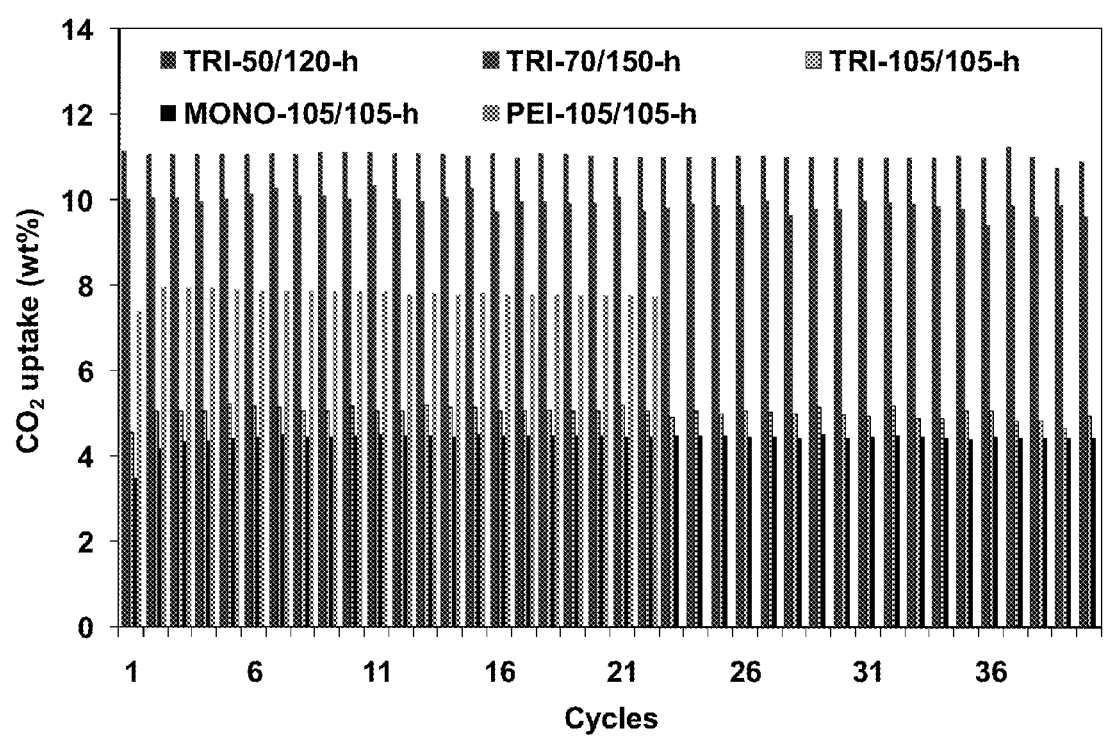
FIG. 2 graphically depicts dynamic $CO_2$ adsorption over a number of $CO_2$ adsorption-desorption cycles on mono amine and triamine grafted pore-expanded MCM-41 (MONO and TRI, respectively) and polyethyleneimine-impregnated pore-expanded MCM-41 (PEI) carried out under various conditions using wet feed and purge gases.

FIG. 2 shows the $CO_2$ adsorption capacity in the same series of experiments as in FIG. 1, except that the feed and the purge gases used for adsorption and desorption were bubbled through a water saturator maintained at 20° C. As seen, dramatic improvement in the stability of the materials was obtained through the use of humid conditions. In all cases, the adsorption capacity was stable throughout all cycles. Thus, this data demonstrates the enhanced stability of amine-containing $CO_2$ adsorbent in the presence of moisture-containing gases, in comparison to the stability in the presence of the same gases without added moisture.

Figure 3:
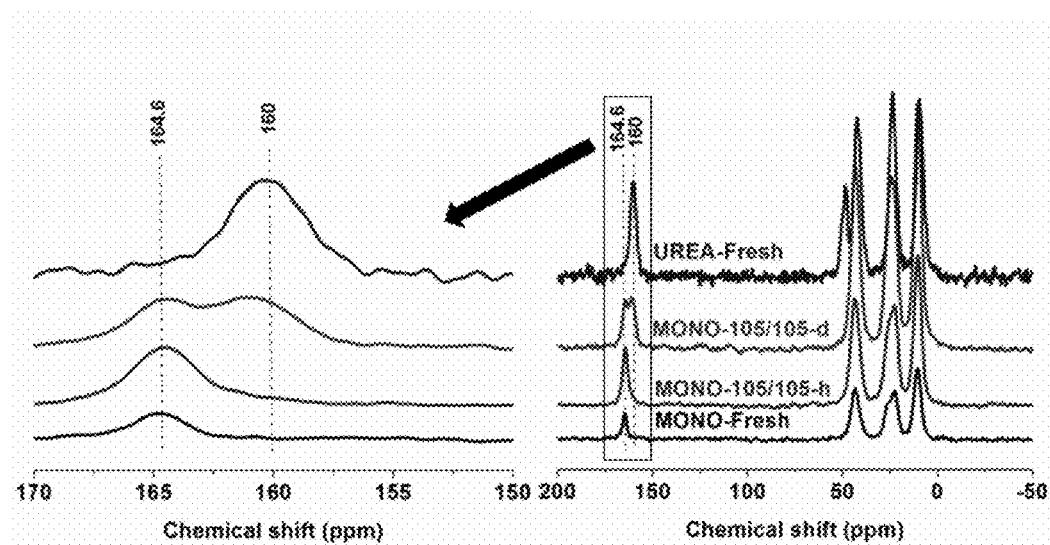
FIG. 3 depicts $^{13}C$ CP MAS NMR for a series of MONO samples and UREA (bis(trimethoxysilylpropyl)urea-grafted MCM-41).

$^{13}$C CP MAS NMR data for a series of MONO samples are shown in FIG. 3. In addition to signals associated with the propyl carbon chain below 50 ppm, the fresh sample exhibited a signal at 165 ppm attributable to carbamate formed via adsorption of atmospheric $CO_2$. The MONO-105/105-d, which lost ca. 45% of its adsorption capacity upon $CO_2$ adsorption-desorption cycling under dry conditions (FIG. 1), exhibited an additional peak at 160 ppm. Interestingly, this peak did not occur in MONO-105/105-h, which underwent the same $CO_2$ cycling procedure, but in humid conditions, i.e., without loss of adsorption capacity. Thus, without wishing to be bound by theory, it was inferred that such species is responsible for the gradual loss of $CO_2$ adsorption capacity. To unambiguously identify this species, it was compared to the signal of the C=O group of bis(trimethoxysilylpropyl)urea-grafted MCM-41, referred to as UREA. Based on the data shown in FIG. 3, it is clear that the gradual deactivation of the adsorbents is due to the progressive formation of urea groups.

Figure 4:
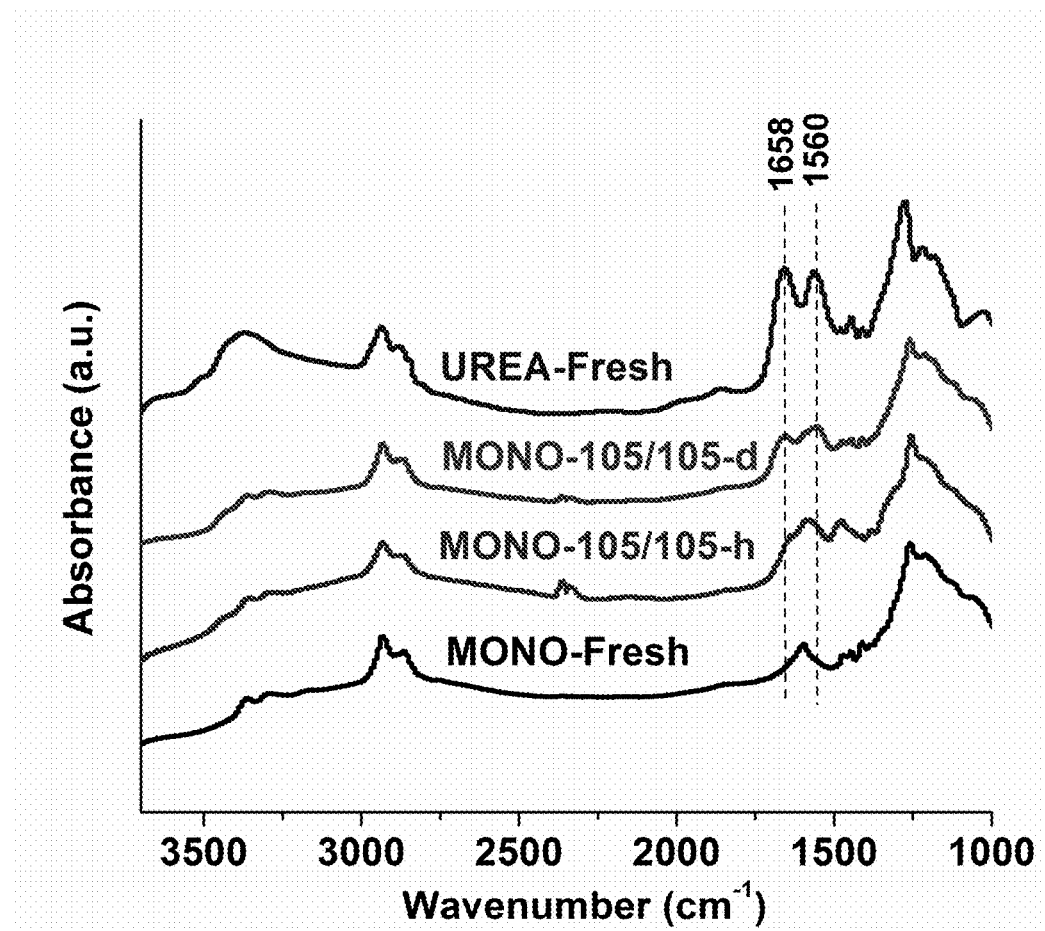
FIG. 4 depicts in situ DRIFT spectra for fresh MONO (MONO-Fresh), MONO after 40 cycles under dry (MONO-105/105-d) and humid (MONO-105/105-h) conditions and for fresh UREA (UREA-Fresh).

The contention that the formation of stable urea groups, favoured under dry conditions, is responsible for the deactivation of the amine-containing $CO_2$ adsorbents was further substantiated by in situ diffuse reflectance infrared Fourier transform (DRIFT). As shown in FIG. 4, as the number of $CO_2$ adsorption-desorption cycles increased, two bands at 1658 and 1560 cm$^{-1}$ developed. Comparison with the DRIFT spectrum of the UREA sample shows clearly that the two new bands are associated with the occurrence of urea groups.

Figure 5:
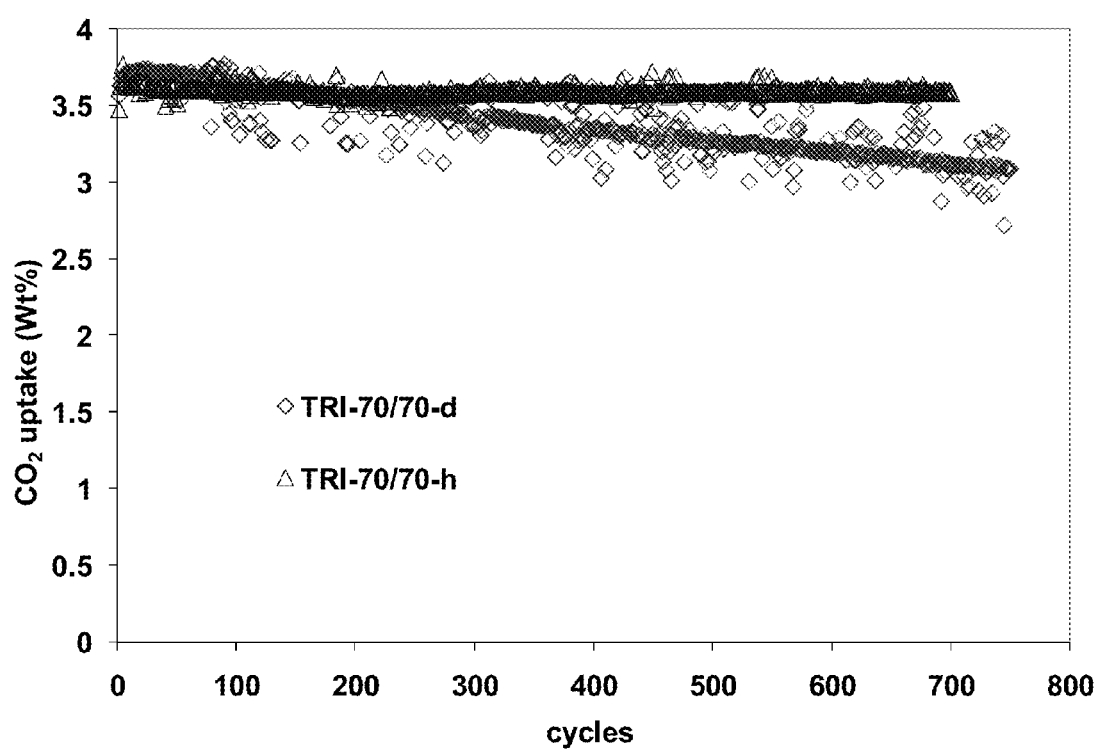
FIG. 5 depicts $CO_2$ adsorption-desorption cycles on TRI-PE-MCM-41 in dry and humid (20° C. as dew point, 7.5% RH) conditions using adsorption and desorption at 70° C.

The occurrence of urea groups takes place even under mild conditions, albeit at much slower rate. FIG. 5 shows that under mild, but dry conditions, TRI-70/70-d which seems to be stable over dozens of cycles, actually deactivates gradually over hundreds of cycles to reach 15% loss after ca. 750 cycles. As in the experiments described earlier, humidification of the gas streams led to a stable material over 700 cycles.

Scheme 1A shows the relationship between amine, $CO_2$, carbamate and urea species during $CO_2$ adsorption-desorption under dry conditions. The urea groups may form by direct interaction between amine species and $CO_2$ at high temperature. Drage et al., 2008 carried out temperature programmed adsorption of $CO_2$ on polyethyleneimine loaded silica under flowing $CO_2$. As the temperature increased, the weight decreased due to the carbamate decomposition. Then, starting at ca. 135° C., a weight increase corresponding to a secondary reaction between $CO_2$ and amine groups was associated with the formation of urea at high temperature. The experiments described herein demonstrate that under repeated $CO_2$ adsorption-desorption cycling, provided that the gas streams are dry, urea groups will form incrementally during adsorption and/or desorption (via carbamate decomposition) even under much milder conditions. Accumulation of heat-resistant urea groups leads ultimately to material deactivation. In contrast, Scheme 1B shows that if moisture-containing gases are used, the formation of urea is strongly inhibited. Indeed, even at a relative humidity as low as 0.4%, as in the case of TRI-70/150-h (FIG. 2), the material did not deactivate.

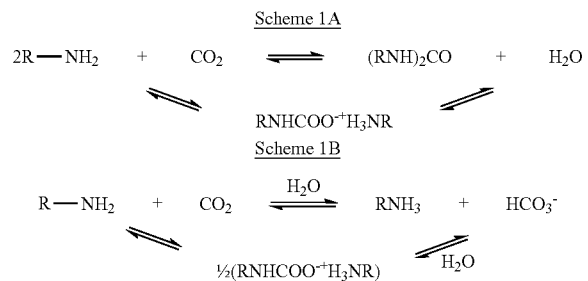

Figure 6:
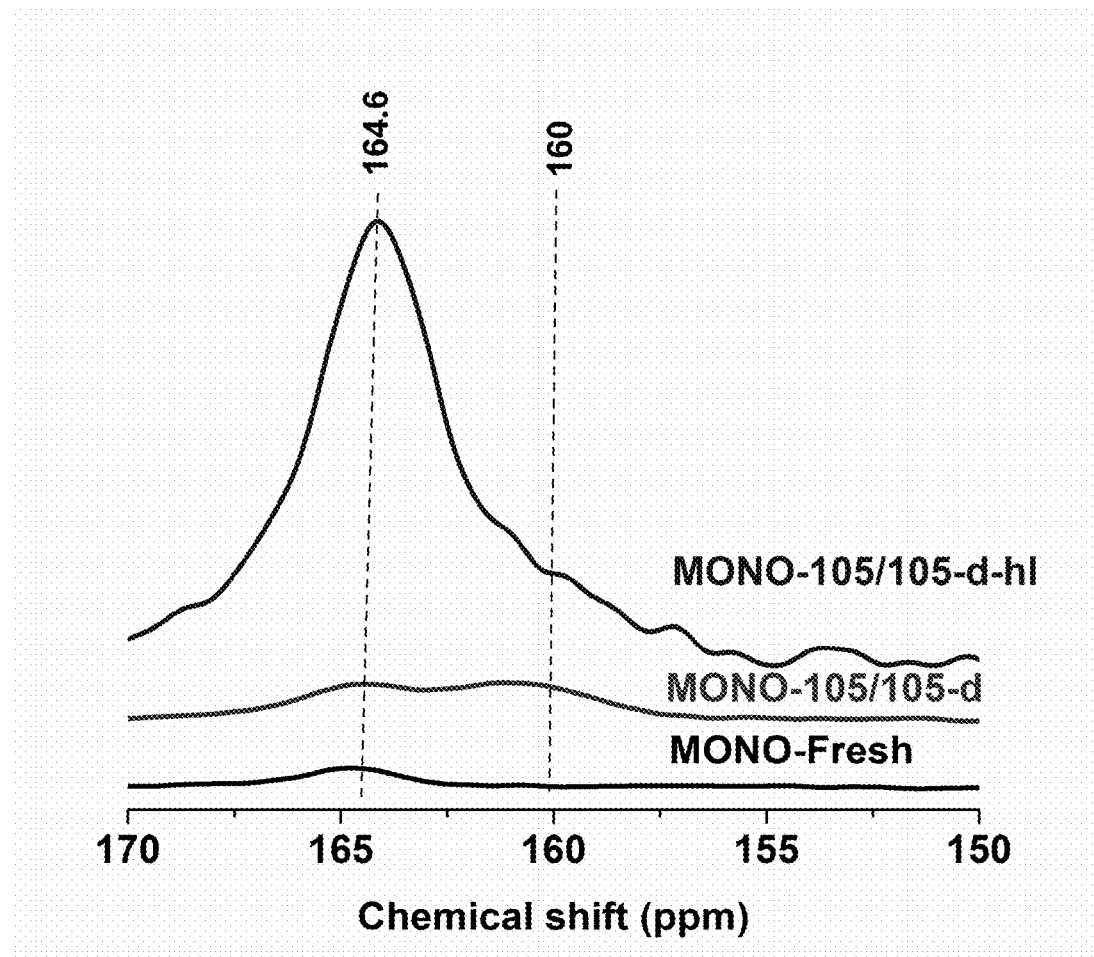
FIG. 6 depicts $^{13}C$ NMR spectra for fresh MONO (MONO-Fresh), MONO after cycling in dry (MONO-105/105-d) condition, and MONO-105/105-d after hydrolysis (MONO-105/105-d-hydr).

Deactivation via formation of urea groups can be reversed via hydrolysis of such species, while preserving the integrity of the material. Heating deactivated MONO-105/105-d at 200° C. under a flow of nitrogen containing as little as 0.15% RH (dew point at 20° C.) for 24 h restored the grafted propylamine completely, as evidenced by $^{13}C$ NMR (FIG. 6) and $CO_2$ adsorption measurements. Nitrogen adsorption measurements at 77 K showed that the structural characteristics (Table 1) of the material were also preserved. Thus, the present invention further provides a method of recovering the adsorption properties for deactivated amine-containing $CO_2$ adsorbents. The method comprises the step of hydrolyzing urea groups formed during the adsorption phase.

Example 2

Figure 7:
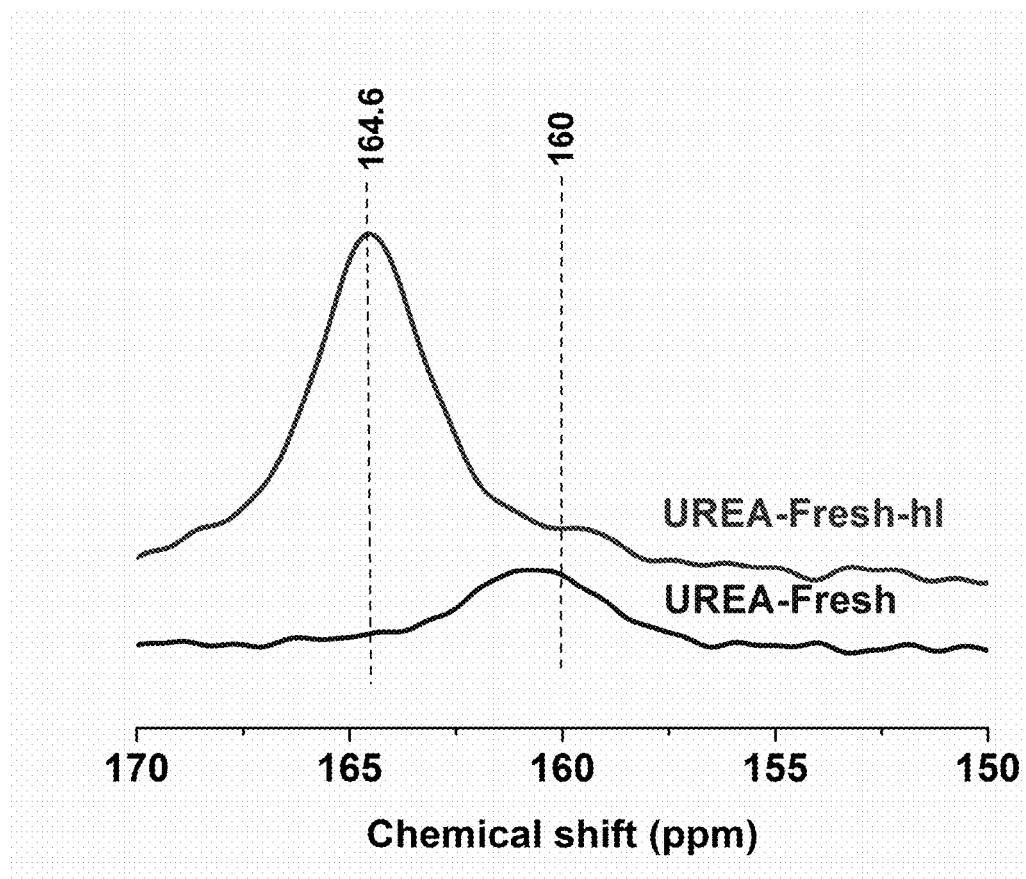
FIG. 7 depicts $^{13}C$ NMR spectra for fresh UREA (UREA-Fresh), UREA-Fresh after hydrolysis (UREA-Fresh-hydr) and MONO-Fresh.
Figure 8:
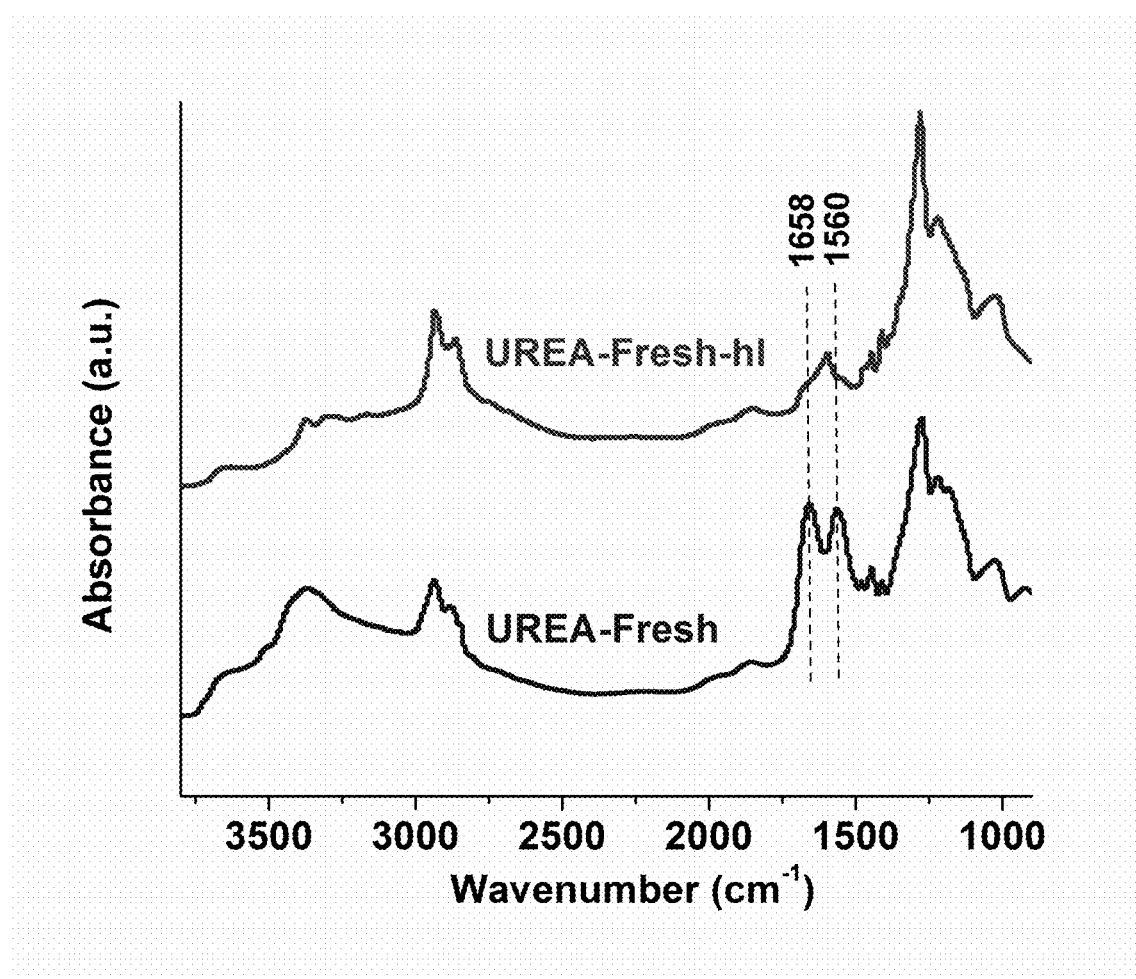
FIG. 8 depicts DRIFT spectra for fresh UREA (UREA-Fresh), UREA-Fresh after hydrolysis (UREA-Fresh-hydr) and MONO-Fresh.

Preparation of Amine-Containing $CO_2$ Adsorbents
Via Hydrolysis of
Bis(Trialkoxysilylalkyl)Urea-Grafted Materials As described above, the UREA sample was hydrolyzed under similar conditions (flowing $N_2$, 200° C., 0.15% RH, 24 h) to generate a propylamine-grafted PE-MCM-41, This is clearly shown by $^{13}C$ NMR (FIG. 7), and DRIFT (FIG. 8). The material thus obtained proved to be an excellent $CO_2$ adsorbent with an equilibrium capacity of 1.3 mmol/g (5.7 wt %) at room temperature and 1 atm in the presence of 5% $CO_2$ in $N_2$. This corresponds to a $CO_2$ adsorption efficiency of $CO_2/N=0.49$.

REFERENCES

Ahnfeldt, T., Gunzelmann, D., Loiseau, T., Hirsemann, D., Senker, J., Ferey, G., Stock, N. Synthesis and modification of a functionalized 3D open-framework structure with MIL-53 topology. *Inorg Chem.* 2009, 48, 3057-3064

Arstad, B., Fjellvag, H., Kongshaug, K. O., Swang, O., Blom, R. Amine functionalized metal organic frameworks (MOFs) as adsorbents for carbon dioxide. *Adsorption* 2008, 14, 755-762

Belmabkhout, Y., Sayari, A. Effect of pore expansion and amine functionalization of mesoporous silica on $CO_2$ adsorption over a wide range of conditions. *Adsorption* 2009, 15, 318-328.

Belmabkhout, Y., Serna-Guerrero, R., Sayari, A. Adsorption of $CO_2$-containing gas mixtures over amine-bearing pore-expanded MCM-41 silica: Application for gas purification. *Ind. Eng. Chem. Res.* 2010, 49, 359-365.

Chen, C., Yang, S. T., Ahn, W-S., Ryoo, R. Amine-impregnated silica monolith with hierarchical pore structure: enhancement of $CO_2$ capture capacity. *ChemComm*, 2009, 3627-3629.

Choi, S., Drese, J. H., Jones, C. W. Adsorbent materials for carbon dioxide capture from large anthropogenic point sources, *ChemSusChem.* 2009, 2, 796-854.

Couck, S., Denayer, J. F. M., Baron, G., Remy, T., Gascon, J., Kapteijn, F. An amine-functionalized Mil-53 metal-organic framework with large separation power for $CO_2$ and $CH_4$. *J. Am. Chem. Soc.* 2009, 131, 6326-6327.

Drage, T. C., Arenillas, A., Smith, K. M., Snape, C. E. Thermal stability of polyethylenimine based carbon dioxide adsorbents and its influence on selection of regeneration strategies. *Microporous Mesoporous Mater.* 2008, 116, 504-512.

Franchi, R., Harlick, P. J. E., Sayari, A. Application of pore-expanded mesoporous silica 2. Development of a high-capacity, water-tolerant adsorbent for $CO_2$, *Ind. Eng. Chem. Res.* 2005, 44, 8007.

Harlick, P. J. E., Sayari, A. Application of pore-expanded mesoporous silica 5. Triamine grafted material with exceptional $CO_2$ dynamic and equilibrium adsorption performance. *Ind. Eng. Chem. Res.* 2007, 46, 446.

Hicks, J. C., Drese, J. D., Fauth, D. J., Gray M, L., Qi, G., Jones, C. W. Designing adsorbents for $CO_2$ capture from flue gas—Hyperbranched aminosilicas capable of capturing $CO_2$ reversibly. *J. Am. Chem. Soc.* 2008, 130, 2902

Ma, X., Wang, X., Song, C. "Molecular basket" sorbent for separation of $CO_2$ and $H_2S$ from various gas streams. *J. Am. Chem. Soc.* 2009, 131, 5777-5783.

Plaza, M. G., Pevida, C., Arias, B., Casal, M. D., Martin, C. F., Fermoso, J., Rubiera, F., Pis, J. J. Different approaches for the development of low-cost $CO_2$ adsorbent. *J. Environ. Eng.* 2009, 135, 426.

Sayari A. and Harlick, P. J. E., Functionalized Adsorbent for the Removal of Acid Gases and Use Thereof, U.S. Pat. No. 7,767,004, Aug. 3, 2010.

Sayari, A., Kruk, M., Jaroniec, M., Moudrakovski, I. L. New approaches to pore size engineering of mesoporous silicates. *Adv. Mater.*, 1998, 10, 1376-1379.

Serna-Guerrero, R., Da'na, E., Sayari, A. New insights into the interactions of $CO_2$ over amine-functionalized silica. *Ind. Eng. Chem. Res.* 2008, 47, 9406-9412.

Yue, M. B., Sun, L. B., Cao, Y., Wang, Y., Wang, Z. J., Zhu, J. H. Efficient $CO_2$ capturer derived from as-synthesized MCM-41 modified with Amine. *Chem. Eur. J.* 2008, 14, 3442.

Zheng, F., Tran, D. N., Busche, B. J., Fryxell, G. E., Addleman, R. S., Zemanian, T. S., Aardahl, C. L. Ethylenediamine-modified SBA-15 as regenerable $CO_2$ adsorbents. *Ind. Eng. Chem. Res.* 2005, 44, 3099-3405.

Vaidhyanathan, R., Iremonger, S. S., Dawson, K-W., Shimizu, G. K. H. An amine-funtionalized metal organic framework for preferential $CO_2$ adsorption at low pressures. *Chem. Commun,* 2009, 5230-5232.

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The embodiments of the invention in which an exclusive property or privilege is claimed are defined as follows:

1. A method of stabilizing an amine-containing $CO_2$ adsorbent over multiple adsorption-desorption cycles comprising contacting said amine-containing $CO_2$ adsorbent with one or more humid gas streams to stabilize the adsorbent, wherein the method comprises an adsorption step of contacting said amine-containing $CO_2$ adsorbent with said one or more humid gas streams, and subsequently a desorption step of contacting said amine-containing $CO_2$ adsorbent with said one or more humid gas streams or a dry gas stream, wherein said contacting steps are repeated during said multiple adsorption-desorption cycles of said system for removal of $CO_2$.

2. The method according to claim 1, wherein said one or more humid gas streams is a humid feed gas stream, a humid purge gas stream, or both a humid feed gas stream and a humid purge gas stream.

3. The method according to claim 2, wherein said amine-containing $CO_2$ adsorbent is within a system for removal of $CO_2$ from a humid $CO_2$-containing feed gas stream and wherein said method comprises contacting said amine-containing $CO_2$ adsorbent with said $CO_2$-containing humid feed gas stream and subsequently contacting said amine-containing $CO_2$ adsorbent with a humid purge gas stream.

4. The method according to claim 2, wherein the purge gas stream is a humid inert gas, a humid non-adsorbing gas, humid $CO_2$ or steam.

5. The method according to claim 1, wherein the relative humidity of each of the one or more humid gas streams is from about 0.1% to about 100%.

* * * * *

UNITED STATES PATENT AND TRADEMARK OFFICE
CERTIFICATE OF CORRECTION

PATENT NO. : 9,314,730 B1
APPLICATION NO. : 12/976557
DATED : April 19, 2016
INVENTOR(S) : Abdelhamid Sayari et al.

It is certified that error appears in the above-identified patent and that said Letters Patent is hereby corrected as shown below:

Title page, item (54) and in the Specification, column 1 should read

-- "Stabilization of Amine-Containing $CO_2$ Adsorbents and Related Systems and Methods" --

Signed and Sealed this
Fifth Day of July, 2016

Michelle K. Lee
*Director of the United States Patent and Trademark Office*